Dec. 24, 1940.  I. W. COX  2,225,687
CONVERTER
Filed Oct. 21, 1938
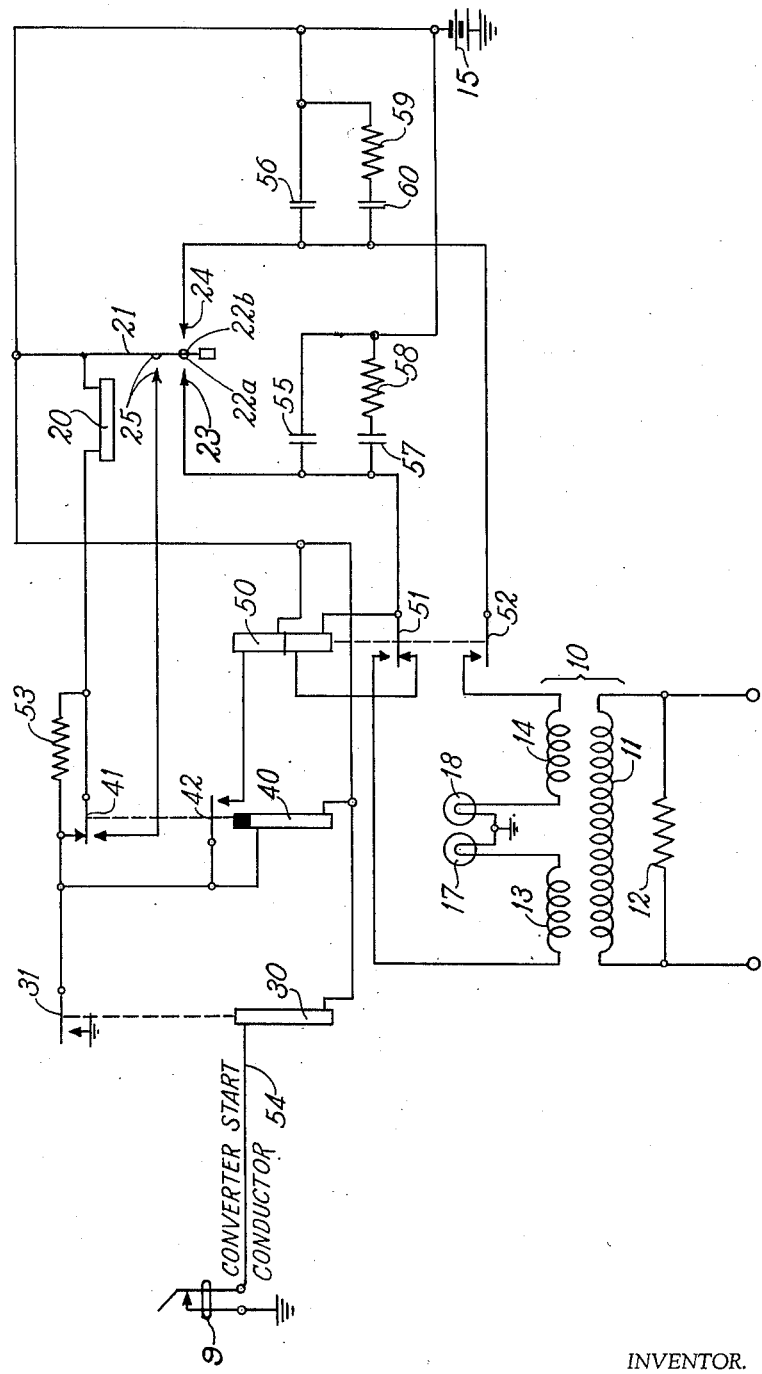
INVENTOR.
Irvin W. Cox
BY Davis, Lindsey, Smith & Shonts
ATTORNEYS.

Patented Dec. 24, 1940

2,225,687

UNITED STATES PATENT OFFICE 2,225,687

CONVERTER

Irvin W. Cox, Milwaukee, Wis., assignor to Associated Electric Laboratories, Inc., Chicago, Ill., a corporation of Delaware Application October 21, 1938, Serial No. 236,195

6 Claims. (Cl. 175—365)

The present invention relates to apparatus for converting direct current into alternating current and, more particularly, to improvements in converters of the vibrator type which are commonly utilized in telephone exchanges for transforming direct current derived from the exchange battery into alternating ringing current of a desired frequency.

A converter of the character mentioned conventionally comprises a coupling device or transformer having a secondary leg adapted to be included in the load circuit of the converter and a pair of primary legs, together with circuits including a source of direct current for alternately energizing the primary legs in directions such that an alternating voltage is developed across the secondary leg. A control device in the form of a vibratory relay is conventionally employed alternately to interrupt and complete the primary leg energizing circuits. Usually the indicated circuits are highly reactive, so that the circuit controlling contacts embodied in the vibratory relay are subjected to surges of high voltage each time they are opened. In order to prevent such voltage surges from causing sparking or arcing at the relay contacts, absorption circuits arranged to shunt the vibratory relay contacts and consisting of a capacitor, or a capacitor and a resistor in series, have previously been used. Ideally, a capacitor having a capacitance value such that all of the transient or surge energy is absorbed, affords the best protection against sparking during the break periods of the contact. Such a capacitor must necessarily shunt the source of direct current as well as the relay contacts so that it is charged during the intervals when the contacts are open-circuited. Hence, when the contacts are closed, the capacitor discharges through the contacts. When the absorption circuit consists of substantially pure capacitance of the proper value to prevent sparking during the contact break periods, an extremely high surge current representing a relatively large amount of energy is dissipated at the relay contacts immediately they are operated into engagement. The time interval of the surge is so short that the contacts are unable to dissipate the generated heat, with the result that fusion of he contact points is likely to occur. To obviate this difficulty it has been the practice in the past to include in the absorption circuit a resistor which increases the time required to discharge the capacitor so that the surge energy may be dissipated at the relay contacts over a longer time interval. The inclusion of such a resistor, however, materially reduces the charging rate of the energy absorbing capacitance and, hence, detracts from the efficiency of the capacitance in minimizing sparking during the contact break periods. Thus, the circuits previously used represent a compromise between the two factors referred to.

It is an object of the present invention to provide, in a converter of the character described, an improved and exceedingly simple arrangement for securing adequate protection against sparking during the contact break periods of the primary circuit controlling contacts without occasioning an undue amount of energy dissipation at the contacts during the contact make periods.

It is another and more specific object of the invention to provide, in a converter of the character described, an improved and exceedingly simple arrangement for minimizing sparking at the primary circuit controlling contacts during the contact break periods and for limiting the instantaneous energy dissipated at the contacts during the contact make periods.

It is a further object of the invention to provide, in a converter of the character described, an improved arrangement for limiting the magnitude of current traversing the primary circuits of the converter when the converter is subjected to heavy loads or its secondary leg is short-circuited.

In the illustrated embodiment of the invention, there is shown a converter which comprises a coupling device in the form of a transformer including a pair of primary legs or windings and a secondary leg or winding adapted to be connected in the output circuit of the apparatus. Two circuits are provided for energizing the respective primary windings, each of which includes a source of direct current which may, for example, comprise the batteries of a telephone exchange. More particularly, a circuit including the source is provided for energizing one of the primary windings to produce a voltage of one polarity across the secondary winding, and a second circuit also including the source is provided for energizing the other of the primary windings to produce a voltage of the opposite polarity across the secondary winding. For the purpose of controlling the two circuits there is provided a control device including contacts for alternately completing the two circuits so that an alternating voltage is developed across the secondary leg of the transformer during operation of the apparatus. In accordance with one feature of the present invention, there are provided a plurality of paths shunting the contacts of the control device and each including capacitance means for receiving a portion of the energy developed in the circuits during the break periods of the contacts, together with auxiliary paths shunting the contacts and also including capacitance means for receiving a further portion of the energy developed in the circuits during the break periods of the contacts. The capacitance means included in the respective paths cooperate to minimize sparking at the contacts during the contact break periods. Means comprising resistors serially included in the auxiliary paths are also provided for limiting the instantaneous energy dissipated at the contacts resulting from the discharge of the capacitance means during the contact make periods, thereby to prevent fusion or burning of the contacts during the contact make periods.

In accordance with a further feature of the invention there is provided in each of the circuits for energizing the primary legs of the coupling device, a device having a substantial and positive current coefficient of resistance which is connected and arranged to limit the current traversing the associated circuit when the secondary leg of the coupling device is connected to a load of low impedance or is short-circuited. The term "positive current coefficient of resistance," as used herein, denotes the characteristic of any device as, for example, a tungsten filament lamp, wherein the resistance of the device is proportional to the current traversing the device. The converter arrangement further comprises a damping resistor which is connected in shunt with the secondary winding of the coupling transformer and functions to prevent high frequency surges from being developed as a consequence of resonant conditions which may occur in the circuit network.

The novel features believed to be characteristic of the invention are set forth with particularity in the appended claims. The invention, both as to its organization and method of operation, together with further objects and advantages thereof, will best be understood by reference to the specification taken in connection with the accompanying drawing, in which the single figure illustrates a converter having embodied therein the features of the invention, as briefly outlined above.

Referring now to the drawing, there is illustrated a direct current-alternating current converter which comprises a coupling device in the form of a transformer 10 having a secondary leg or winding 11 adapted to be included in the output circuit of the converter and having connected in shunt therewith a damping resistor 12. The transformer 10 further comprises a pair of primary windings 13 and 14 which are arranged to be energized from a source of direct current 15. More particularly, there is provided a circuit including the source 15 and a tungsten filament lamp 17 for energizing the winding 13, and a second circuit also including the source 15, and a second tungsten filament lamp 18 for energizing the winding 14. For the purpose of alternately completing the two circuits, there is provided a control device in the form of a vibratory relay 20 having a weighted armature 21 which carries contacts 22a and 22b arranged alternately to engage stationary contacts 23 and 24, respectively included in the circuits for energizing the windings 13 and 14. The relay 20 further comprises a pair of contacts 25 which are utilized in controlling the operation of the relay 20. The converter further comprises a start switch 9 and three additional relays 30, 40 and 50, which are provided for controlling the operation of the vibrator relay during the starting periods.

As explained above, there is also provided, in accordance with one feature of the present invention, a plurality of paths shunting the contacts of the relay 20 and including capacitance means for absorbing the surge energy developed in the windings 13 and 14 during the break periods of the indicated relay contacts, together with a plurality of auxiliary paths also including capacitance means for receiving a further portion of the transient energy developed in the indicated windings during the contact break periods. More particularly, there is provided one path comprising a capacitor 55 which is arranged to shunt the contacts 22a and 23 of the relay 20, and a second path comprising a capacitor 56 which is connected to shunt the contacts 22b and 24 of the relay 20. An auxiliary path arranged to shunt the contacts 22a and 23 of the relay 20 is also provided which serially includes a condenser 57 and a resistor 58. The auxiliary path connected in shunt with the contacts 22b and 24 similarly includes a capacitor 60 and a resistor 59 connected in series.

Neglecting for the present the particular manner in which the paths described in the preceding paragraph function to prevent damage to the contacts of the vibratory relay 20, and considering the operation of the converter generally, when ground potential is impressed upon the converter start conductor 54 through operation of the start switch 9, the start relay 30 is energized over an obvious circuit and operates to complete at its armature 31, an obvious circuit for energizing the slow-to-operate relay 40 and a circuit extending by way of the armature 41 for energizing the winding of the vibratory relay 20. When energized over the last-mentioned circuit, the relay 20 attracts its armature 21 to close the contacts 25 and to move the contact 22a into engagement with the contact 23. Thereafter, and when the slow-to-operate relay 40 operates, the winding of the relay 20 is short-circuited over a path including the armature 41 and its associated working contact, and the contacts 25. The relay 20 is now deenergized and releases its weighted armature 21 so that this armature starts to vibrate to move the contacts 22a and 22b alternately into engagement with their respective associated contacts 23 and 24. When the armature 21 is released, the contacts 25 are opened to interrupt the above-traced path short-circuiting the winding of the relay 20, with the result that this winding is energized over an alternative circuit which may be traced as extending from ground at the armature 31 by way of the resistor 53, and the winding of the relay 20 to battery. Thereafter, and each time the weighted armature 21 operates to close the contacts 25, the previously traced path for short-circuiting the winding of the relay 20 is completed, with the result that this relay is deenergized. Thus, the winding of the relay 20 is alternately energized and deenergized and vibratory movement of the armature 21 is sustained. The resistance value of the resistor 53, included in the alternative circuit for energizing the relay 20, is such that the magnitude of the current traversing this alternative circuit is just sufficient to sustain the continuous vibratory movement of the armature 21. It will be understood that the rate of vibration of the armature 21 between its two extreme positions is determined by the natural period of this armature.

When the relay 40 operates, it not only functions to short-circuit the winding of the relay 20 in the manner explained above, but, in addition, completes, at its armature 42, a circuit extending from ground at the armature 31 for energizing the upper winding of the relay 50. Normally, the lower winding of the last-mentioned relay is short-circuited through its armature 51 and, hence, is slow to operate. Thus, a time interval is provided for insuring a steady state operating condition on the part of the vibratory relay 20 before the relay 50 operates to prepare the circuits described previously for energizing the primary windings of the transformer 10. When the relay 50 operates, it opens, at its armature 51 and the resting contact associated therewith, a point in the path normally short-circuiting its own lower winding, and prepares a point in the circuit for energizing the winding 13 of the transformer 10. At its armature 52, the relay 50 similarly prepares a point in the circuit for energizing the other primary winding 14 of the transformer 10. With the relay 50 operated and the armature 21 of the relay 20 vibrating between its two extreme positions, the two last-mentioned circuits are alternately completed. Thus, when the contact 22a is moved into engagement with its associated contact 23, current starts to traverse the primary winding 13 in a direction which may be traced as extending from the positive terminal of the current source 15, through the filament of the lamp 17, the winding 13, the armature 51, the contacts 23 and 22a, and the armature 21 to the negative terminal of the source 15. Due to the self-inductance of the winding 13 and the mutual inductance between this winding and the two windings 11 and 14, the build-up of current through the winding 13 is gradual. At approximately the time the current reaches its maximum value, the contact 22a is moved out of engagement with the contact 23 to interrupt the circuit for energizing the winding 13, with the result that the current traversing the winding 13 gradually decreases to a zero value. At approximately the time the current through the winding 13 reaches a zero value, the contacts 22b and 24 are closed to complete the circuit for energizing the other primary winding 14. The direction of current flow through the last-mentioned winding may be traced as extending from the positive terminal of the battery 15, through the filament of the lamp 18 and by way of the winding 14, the armature 52, the contact 24, the contact 22b, and the armature 21 to the negative terminal of the battery 15. Here again the current through the winding 14 gradually increases, following closure of the contacts 22b and 24, and gradually decreases to zero when the indicated contacts are opened. Since the currents alternately traversing the two windings 13 and 14 are in opposite directions, an alternating induced voltage is developed in the secondary winding 11, which voltage has a frequency determined by the frequency of vibration of the weighted armature 21.

When the alternating current output from the converter is no longer desired, the apparatus embodied therein may be restored to normal by restoring the switch 9 to normal to remove ground potential from the start conductor 54, thereby to deenergize the start relay 30. Upon restoring, this relay opens, at its armature 31, a point in the common portion of the respective circuits for energizing the relays 40, 50 and 20. The two relays 40 and 50 immediately restore, the last-mentioned thereof operating to open points in the above-traced circuits for respectively energizing the transformer primary windings 13 and 14. When the circuit for energizing the winding of the relay 20 is interrupted, no further sustaining pulses of current are transmitted thereto, and the amplitude of vibration of the armature 21 gradually decreases until finally this armature assumes its normal position wherein all of its contacts are open-circuited. Thus, the control apparatus of the converter is fully restored to normal.

Referring now more particularly to the energy absorbing paths connected in shunt with the contacts 22a, 22b, 23 and 24 of the vibratory relay 20, and considering the paths shunting the contacts 22a and 23 by way of example, it is pointed out that the capacitor 55 has a relatively low capacitance value of the order of .4 microfarad, and the path including this capacitor is substantially free from resistance. Thus, the time constant of this path is extremely small. The capacitor 57 included in the auxiliary path shunting the contacts 22a and 23, on the other hand, has a relatively large capacitance value of the order of 2 microfarads, while the resistor 58, also included in this path, has a resistance of the order of 200 ohms. Thus, the time constant of the auxiliary path is relatively large. Normally and with the above-traced circuit for energizing the winding 13 open, the two paths shunting the contacts 22a and 23 are connected across the current source 15 in series with the winding 13 and the lamp 17 so that they are charged to the full potential of the source 15. During each contact make period of the contacts 22a and 23 to close the indicated circuit, the full charge of the capacitor 55 is dissipated as heat at the contacts 22a and 23 the instant a point to point engagement is established between the contacts. Since, however, the capacitor 55 is relatively small, the charge of this capacitor is also small, and, hence, the energy dissipated as a result of this charge is considerably less than the amount required to cause fusion of the contacts. The capacitor 57 similarly starts to discharge during the instant of each contact make period of the contacts 22a and 23 when a point to point engagement is established between these two contacts. Since, however, the resistor 58 is included in the discharge path of the capacitor 57, it functions to dissipate a large portion of the energy accumulated in this capacitor. Due to the relatively large time constant of the path including the resistor 58 and the capacitor 57, the dissipation of the energy accumulated in the capacitor 57 is spread out over a relatively long time interval, and hence the contacts are not required to dissipate a large amount of heat in a very short time. As a result, the total instantaneous energy which is dissipated at the contacts 22a and 23 is insufficient to cause fusion or burning of the contacts. Thus, by providing the paths of different time constants in shunt with the contacts 22a and 23, these contacts are protected against burning or fusion during the contact make periods.

It will be observed that, after the capacitors 55 and 57 are discharged through closure of the contacts 22a and 23, in the manner set forth in the preceding paragraph, these capacitors are effectively short-circuited and no energy is stored therein. During each break period of the indicated contacts and the instant the contacts start to separate, the magnetic field developed in the winding 13 starts to collapse so that a counter E. M. F. or voltage is developed across the terminals of the winding 13. This voltage is additive with respect to the voltage of the source 15 and tends to increase the total voltage across the contacts 22a and 23. As this back voltage builds up, the capacitors 55 and 57 start to charge. Due to the relatively small time constant of the path including the capacitor 55, this capacitor absorbs the stored energy in the winding 13 during the initial movement of the contact 22a away from the contact 23. Due to the relatively large time constant of the auxiliary path comprising the resistor 58, the capacitor 57 is only partially charged when the smaller capacitor 55 reaches its fully charged condition. Hence, the capacitor 57 continues to absorb the transient energy developed in the winding 13 after the capacitor 55 reaches its fully charged condition and during the continued movement of the contact 22a away from the contact 23. Thus, the stored energy in the winding 13 is effectively absorbed in the two paths shunting the contacts 22a and 23, with the result that these contacts are separated during the break periods thereof with a minimum of sparking or arcing. The manner in which the paths shunting the contacts 22b and 24 of the relay 20 function to protect these contacts, during the contact make and contact break periods, is identical with that just described with reference to the paths shunting the contacts 22a and 23. While, in the illustrated arrangement, only two paths having different time constants are connected in shunt with each of the two sets of contacts, it will be understood that additional paths having successively larger time constants may, if desired, or necessary, be connected in shunt with each set of contacts.

One of the factors influencing the operating conditions of the relay contacts utilized in completing and interrupting the circuits including the two windings 13 and 14, is the load imposed upon the converter. Thus, if the impedance of the load connected across the secondary winding 11 of the transformer 10 is low or this winding is short-circuited, the current traversing each of the indicated circuits during the periods when the circuits are completed tends to be high, with the result that a relatively large amount of energy is stored in the two windings 13 and 14 at those instants when the circuit interrupting contacts of the vibratory relay 20 are opened. In the absence of the current limiting devices 17 and 18 and if the converter load is sufficiently great, the energy stored in the windings 13 and 14 at the instants when the circuits for energizing these windings are broken may exceed the energy storing capacity of the absorbing paths, thereby to cause excessive sparking at the contacts 22a, 22b, 23 and 24 during the contact break intervals. In order to limit the current which may traverse the windings 13 and 14, and thus limit the energy which may be stored in these windings at the instants when the respective energizing circuits are broken, the two lamps 17 and 18 are provided. Considering the lamp 17 by way of example, it is pointed out that this lamp is of the well-known tungsten filament type possessing a substantial positive current coefficient of resistance. In other words, the lamp 17 is characterized by a relatively high hot to cold resistance ratio. Preferably, the hot to cold resistance ratio of each of the lamps 17 and 18 is of the order of 10:1, the cold resistance being approximately 1.024 ohms and the hot resistance being approximately 10.24 ohms. With the lamp 17 serially included in the circuit for energizing the winding 14, it will be apparent that, as the current traversing this circuit starts to increase in average magnitude, due to an increasing load imposed upon the converter, the resistance of the lamp 17 tends to rise, and, upon rising, lowers the current. Thus, the lamp 17 functions to limit the current traversing the winding 13 and to restrict the amount of energy which may be stored in this winding. In a similar manner, the lamp 18 functions to limit the current which may traverse the winding 14, and thus to restrict the amount of energy which may be stored in the last-mentioned winding. If desired, a single lamp may be substituted for the two lamps 17 and 18 without in any way altering the operation of the circuit. To this end the two inner terminals of the windings 13 and 14 may be connected together, and the junction therebetween connected through a single lamp to ground so that the lamp operates on both halves of each alternating current cycle.

The capacitance included in the energy absorbing paths just described may, under certain conditions of light load, tend to resonate with the inductance of the associated primary windings to cause high frequency components of voltage to be included in the ouput voltage of the converter, thus causing a distortion in the output voltage wave form. To obviate this difficulty, the damping resistor 12 is provided in shunt with the secondary winding 11 of the transformer 10.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A converter comprising a coupling device including a pair of primary windings and a secondary winding adapted to be connected to a load circuit, a circuit including a source of direct current for energizing one of said primary windings to produce voltage of one polarity across said secondary winding, a second circuit also including said source of direct current for energizing the other of said primary windings to produce a voltage of opposite polarity across said secondary winding, a control device including contacts for alternately completing said circuits, thereby to cause an alternating voltage to be developed across said secondary winding, each of said circuits including a device having a substantial positive current coefficient of resistance connected and arranged to limit the current traversing the associated circuit when said secondary winding is connected to a load of low impedance or is short-circuited, paths shunting said contacts and including capacitance means for receiving a portion of the energy developed in said circuits during the break periods of said contacts, thereby to minimize sparking at said contacts, and impedance means independent of said paths for limiting the instantaneous energy dissipated at said contacts and resulting from the discharge of said capacitance means during the make periods of said contacts, thereby to prevent fusion of said contacts.

2. A converter comprising a coupling device including a pair of primary windings and a secondary winding adapted to be connected to a load circuit, a circuit including a source of direct current for energizing one of said primary windings to produce voltage of one polarity across said secondary winding, a second circuit also including said source of direct current for energizing the other of said primary windings to produce a voltage of opposite polarity across said secondary winding, a control device including contacts for alternately completing said circuits, thereby to cause an alternating voltage to be developed across said secondary winding, each of said circuits including a device having a substantial positive current coefficient of resistance connected and arranged to limit the current traversing the associated circuit when said secondary winding is connected to a load of low impedance or is short-circuited.

3. A converter comprising a coupling device including a pair of primary windings and a secondary winding adapted to be connected to a load circuit, a circuit including a source of direct current for energizing one of said primary windings to produce voltage of one polarity across said secondary winding, a second circuit also including said source of direct current for energizing the other of said primary windings to produce a voltage of opposite polarity across said secondary winding, and a control device including contacts for alternately completing said circuits, thereby to cause an alternating voltage to be developed across said secondary winding, each of said circuits serially including a lamp having a substantial positive current coefficient of resistance connected and arranged to limit the current traversing the associated circuit when said secondary winding is connected to a load of low impedance or is short-circuited.

4. A converter comprising a coupling device including a pair of primary windings and a secondary winding, a circuit including a source of direct current for energizing one of said primary windings to produce voltage of one polarity across said secondary winding, a second circuit also including said source of direct current for energizing the other of said primary windings to produce a voltage of opposite polarity across said secondary winding, a control device including contacts for alternately completing said circuits, thereby to cause an alternating voltage to be developed across said secondary winding, paths shunting said contacts and including capacitance means for receiving a portion of the energy developed in said circuits during the break periods of said contacts, thereby to minimize sparking at said contacts, impedance means independent of said paths for limiting the instantaneous energy dissipated at said contacts and resulting from the discharge of said capacitance means during the make periods of said contacts, thereby to prevent fusion of said contacts, and a damping resistor connected in shunt with the secondary winding of said coupling device.

5. A converter comprising a coupling device including a pair of primary windings and a secondary winding adapted to be connected to a load circuit, a circuit including a source of direct current for energizing one of said primary windings to produce voltage of one polarity across said secondary winding, a second circuit also including said source of direct current for energizing the other of said primary windings to produce a voltage of opposite polarity across said secondary winding, a control device including contacts for alternately completing said circuits, thereby to cause an alternating voltage to be developed across said secondary winding, each of said circuits including a device having a substantial positive current coefficient of resistance connected and arranged to limit the current traversing the associated circuit when said secondary winding is connected to a load of low impedance or is short-circuited, paths shunting said contacts and including capacitance means for receiving a portion of the energy developed in said circuits during the break periods of said contacts, thereby to minimize sparking at said contacts, impedance means independent of said paths for limiting the instantaneous energy dissipated at said contacts and resulting from the discharge of said capacitance means during the make periods of said contacts, thereby to prevent fusion of said contacts, and a damping resistor connected in shunt with the secondary winding of said coupling device.

6. A converter comprising a coupling device including a pair of primary windings and a secondary winding adapted to be connected to a load circuit, a circuit including a source of direct current for energizing one of said primary windings to produce voltage of one polarity across said secondary winding, a second circuit also including said source of direct current for energizing the other of said primary windings to produce a voltage of opposite polarity across said secondary winding, a control device including contacts for alternately completing said circuits, thereby to cause an alternating voltage to be developed across said secondary winding, each of said circuits including a device having a substantial positive current coefficient of resistance connected and arranged to limit the current traversing the associated circuit when said secondary winding is connected to a load of low impedance or is short-circuited, and a damping resistor connected in shunt with the secondary winding of said coupling device.

IRVIN W. COX.